(12) United States Patent
Luo et al.

(10) Patent No.: US 9,804,379 B2
(45) Date of Patent: Oct. 31, 2017

(54) FOLLOW-UP FIXED FOCUS SYSTEM (71) Applicant: SHANGHAI RUIYU BIOTECH CO., LTD., Shanghai (CN)

(72) Inventors: Puwen Luo, Shanghai (CN); Rui Chen, Shanghai (CN)

(73) Assignee: SHANGHAI RUIYU BIOTECH CO., LTD., Shanghai (CN)

(*) Notice: Subject to any disclaimer, the term of this patent is extended or adjusted under 35 U.S.C. 154(b) by 0 days.

(21) Appl. No.: 15/313,160

(22) PCT Filed: Dec. 29, 2015

(86) PCT No.: PCT/CN2015/099344
§ 371 (c)(1),
(2) Date: Nov. 22, 2016

(87) PCT Pub. No.: WO2016/107530
PCT Pub. Date: Jul. 7, 2016

(65) Prior Publication Data
US 2017/0192218 A1 Jul. 6, 2017

(30) Foreign Application Priority Data
Dec. 29, 2014 (CN) .......................... 2014 1 0848643

(51) Int. Cl.
G02B 21/26 (2006.01)
G02B 21/00 (2006.01)
(Continued)

(52) U.S. Cl.
CPC ............. *G02B 21/26* (2013.01); *G02B 21/00* (2013.01); *G02B 21/0008* (2013.01);
(Continued)

(58) Field of Classification Search
CPC ...... G02B 21/00; G02B 21/241; G02B 21/26; G02B 21/362
(Continued)

(56) References Cited

U.S. PATENT DOCUMENTS 3,519,334 A  7/1970 Heitmann et al.
4,082,458 A * 4/1978 Fukui ..................... G01N 21/55
                                                        356/432
(Continued)

FOREIGN PATENT DOCUMENTS

CN        1038352         12/1989
CN        202114396 U      1/2012
(Continued)

OTHER PUBLICATIONS

SIPO Second Office Action issued in Chinese Patent Application No. 201410848643.1 dated Oct. 25, 2016 (with English translation) (17 pages).
(Continued)

*Primary Examiner* — Frank Font
(74) *Attorney, Agent, or Firm* — RatnerPrestia (57) ABSTRACT A follow-up fixed focus system includes a fixed focus device, and the second end of the fixed focus device is in contact with a sample plate; when the sample plate has a small protrusion, the second end of the fixed focus device is pushed by the protrusion of the sample plate. When the sample plate has a small depression, the second end of the fixed focus device is in contact with the sample plate all the time under the action of self gravity of an observation device, so that the imaging distance between an object lens and the sample plate is kept unchanged.

15 Claims, 6 Drawing Sheets (51) Int. Cl.
*G02B 21/24* (2006.01)
*G02B 21/36* (2006.01)
*G02B 25/00* (2006.01)

(52) U.S. Cl.
CPC .......... *G02B 21/241* (2013.01); *G02B 21/362* (2013.01); *G02B 25/005* (2013.01)

(58) Field of Classification Search
USPC ................................ 359/382, 383, 391, 392
See application file for complete search history.

(56) References Cited

U.S. PATENT DOCUMENTS

| | | | |
|---|---|---|---|
| 4,930,851 A | 6/1990 | Yamamoto | |
| 5,793,524 A | 8/1998 | Luloh | |
| 6,337,766 B1* | 1/2002 | Fujino | G02B 21/242 |
| | | | 359/368 |
| 6,731,327 B1 | 5/2004 | Kujawa et al. | |
| 7,372,626 B2* | 5/2008 | Villa | G02B 21/241 |
| | | | 359/368 |
| 7,995,272 B2* | 8/2011 | Bratt | G02B 21/02 |
| | | | 359/391 |
| 8,184,366 B2* | 5/2012 | Liang | G02B 21/0008 |
| | | | 359/368 |
| 2003/0030898 A1* | 2/2003 | Roeth | G02B 21/06 |
| | | | 359/385 |
| 2006/0164723 A1* | 7/2006 | Storz | G02B 21/24 |
| | | | 359/383 |
| 2013/0090778 A1* | 4/2013 | Brill | G01N 1/286 |
| | | | 700/302 |
| 2013/0342902 A1* | 12/2013 | Krueger | G02B 21/242 |
| | | | 359/383 |

FOREIGN PATENT DOCUMENTS

| | | |
|---|---|---|
| CN | 102410973 A | 4/2012 |
| CN | 102436062 A | 5/2012 |
| CN | 102507509 A | 6/2012 |
| CN | 204028456 U | 12/2014 |
| CN | 104459965 A | 3/2015 |
| CN | 204405937 U | 6/2015 |
| EP | 0 026 109 | 4/1981 |
| EP | 2 518 471 A | 10/2012 |
| FR | 2833718 A1 | 6/2003 |
| JP | H0486721 A | 3/1992 |
| JP | 2001-083391 A | 3/2001 |
| JP | 2013-020205 A | 1/2013 |
| WO | 2006111356 A1 | 10/2006 |

OTHER PUBLICATIONS

International Search Report issued in PCT/CN2015/099344 dated Feb. 25, 2016 (4 pages).
PCT Written Option of the International Search Authority issued in PCT/KR2015/099344 dated Feb. 25, 2016 (13 pages).
Supplementary European Search Report issued in EP 15 87 5206, dated Aug. 23, 2017, 9 pages.

* cited by examiner

FOLLOW-UP FIXED FOCUS SYSTEM

CROSS REFERENCE TO RELATED APPLICATIONS

This application is a U.S. National Phase Application of PCT Application No. PCT/CN2015/099344, filed Dec. 29, 2015, which claims the benefit of priority to Chinese Patent Application No. 201410848643.1 titled "FOLLOW-UP FIXED FOCUS SYSTEM", filed with the Chinese State Intellectual Property Office on Dec. 29, 2014, the entire disclosures of which are incorporated herein by reference.

FIELD

The present application relates to the field of microscopic imaging, and more particularly to a follow-up fixed focus system.

BACKGROUND

In microscopic imaging, a sample plate is zoomed in by the microscope via an objective lens. There are multiple samples on the sample plate, and the sample plate needs to be moved after one sample is tested, which allows the objective lens to be aligned with another sample and zoom in the sample for imaging. When a test is performed on each of the samples, it is required to ensure that the distance between the sample plate and the objective lens is maintained to be unchanged, i.e., the working distance for imaging each of the samples is maintained to be unchanged.

However, a movable platform for mounting the sample plate has flatness error caused by machining technique itself, and flatness error also presents in mounting the movable platform to the sample plate, and the sample plate itself also has flatness error, therefore, when the sample plate moves from one sample point A to another sample point B, the issue that the point A and the point B are not in the same plane may occur, causing a difference between the imaging distance of the sample point A and the imaging distance of the sample point B, thus resulting in the situation of deviating from the best focus.

For this reason, the issue of deviating from the best focus is generally addressed by the following methods in the conventional technology.

A first method is that a microscope manufacturer improves the accuracy of machining and assembling techniques, which allows the flatness errors of the sample plate and the movable platform to be minimized, however, the improvement to the machining and assembling techniques reaches a limit, which is not easy to achieve.

A second method is that a focusing structure is provided in the microscope, and when deviation of focus occurs, an operator can fine-tune the focal length himself by experience. However, this may cause a complicated imaging operation, low efficiency, and a subjective interference to the imaging effect.

A third method is that a intelligent automatic focusing system, such as an infrared ranging system, a grating ranging system, or automatic focusing systems such as an image recognition automatic focusing system is employed, however, such systems generally contain a precise ranging system, a PLC control system, a motor drive system, an image analysis system, and etc., which results in a complicate system, high cost, and inferior stability and adaptability.

Therefore, it is required presently to provide a solution which has a simple structure, a low cost and a good stability, which address an issue of focus deviation of a sample being caused by movement of the movable platform.

SUMMARY

A follow-up fixed focus system is provided according to an aspect of the present application, the system has a simple structure, a low cost and a good stability, which addresses an issue of focus deviation of a sample being caused by movement of a movable platform.

To address the above issue, a following technical solution is provided according to the present application.

A follow-up fixed focus system, includes:

a stage; a sample plate fixed on the stage; a support frame vertically connected to the stage; an observation device slidably arranged on the support frame, wherein the observation device includes a camera or an eyepiece, an objective lens and a lens barrel part; and a fixed focus device having one end fixedly connected to the observation device and another end in contact with the sample plate, wherein a vertical distance between the sample plate and the objective lens is maintained to be unchanged.

The system may further include an elastic structure connected to the support frame and the observation device or connected to the support frame and the fixed focus device, and the elastic structure may support the observation device and the fixed focus device.

The elastic structure may include:

a mechanical elastic device, a pneumatic elastic device and/or a hydraulic elastic device.

In the case that the observation device is upright, the mechanical elastic device may include:

a position-limiting component arranged on the support frame; a connecting rod running through the position-limiting component, wherein the connecting rod has one end fixedly connected to the observation device or the fixed focus device and another end provided with a projection; and a spring sleeved on the connecting rod and stuck between the position-limiting component and the projection.

When the observation device is upside down, the mechanical elastic device may include:

a position-limiting component arranged on the support frame; a connecting rod running through the position-limiting component, wherein the connecting rod has one end fixedly connected to the observation device or the fixed focus device, and another end which is fixed; a spring sleeved on the connecting rod and stuck between the position-limiting component and the observation device.

One end of the connecting rod connected to the observation device may specifically be:

one end of the connecting rod fixedly connected to the lens barrel part of the observation device; or one end of the connecting rod connected to the objective lens of the observation device; or one end of the connecting rod connected to the camera or the eyepiece of the observation device.

The observation device slidably arranged on the support frame may specifically be:

the lens barrel part of the observation device slidably arranged on the support frame; or the objective lens of the observation device slidably arranged on the support frame; or the camera or the eyepiece of the observation device slidably arranged on the support frame.

The lens barrel part may include:

a connecting platform and a lens barrel, and the connecting platform has one end fixedly connected to the lens barrel and another end slidably arranged on the support frame.

The fixed focus device may be a support rod, and the support rod has one end fixedly connected to the observation device and another end in contact with the sample plate.

The fixed focus device may include a support rod and a light-transmittable component, and the support rod has one end fixedly connected to the observation device and another end fixedly connected to the light-transmittable component, and a space between the objective lens and the light-transmittable component is hollow.

One end of the support rod fixedly connected to the observation device may specifically be:

one end of the support rod fixedly connected to the camera or the eyepiece of the observation device; or one end of the support rod being fixedly connected to the lens barrel of the observation device; and/or one end of the support rod being fixedly connected to the objective lens of the observation device.

The follow-up fixed focus system is provided according to the present application. This system includes the fixed focus device, and the second end of the fixed focus device is in contact with the sample plate. When the sample plate has a small protrusion, the second end of the fixed focus device is pushed by the protrusion of the sample plate, causing the observation device to move upward along with the protrusion. Since the positions of the objective lens and the fixed focus device are unchanged, it can further maintain the distance between the objective lens and the sample plate to be unchanged, i.e., the imaging distance to be unchanged. When the sample plate has a small depression, the second end of the fixed focus device is always in contact with the sample plate under the action of self gravity of the observation device, which maintains the imaging distance between the objective lens and the sample plate to be unchanged.

The system achieves the object of the present application by simply adding the fixed focus device, and the fixed focus device has a simple structure, a low cost, and is easy to implement, and has a good stability, which addresses the issue of focus deviation of sample imaging caused by the movement of the movable platform.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for the person skilled in the art, other drawings may be obtained based on these drawings without any creative efforts.

DETAILED DESCRIPTION

The technical solutions of the embodiments of the present application will be clearly and completely described hereinafter in conjunction with the drawings of the embodiments of the present application. The embodiments described are only some examples of the present application, and not all implementations. Other embodiments obtained by those skilled in the art based on the embodiments of the present application without any creative efforts all fall into the protection scope of the present application.

Figure 1:
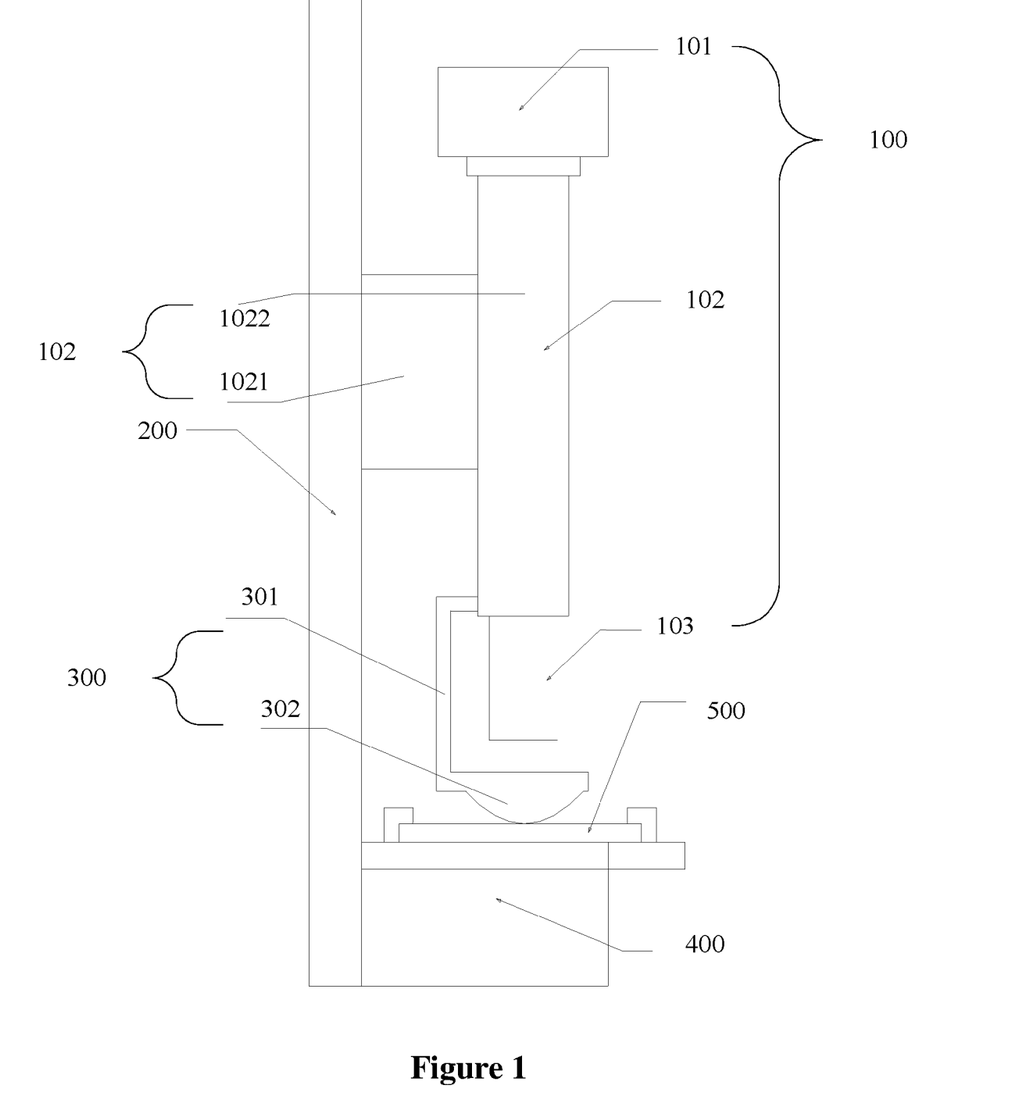
FIG. 1 is a view showing the structure of a follow-up fixed focus system disclosed in an embodiment of the present application.

As shown in FIG. 1, a follow-up fixed focus system is provided according to the present application, which includes:

a stage 400; a sample plate 500 fixed on the stage 400; a support frame 200 vertically connected to the stage 400; an observation device 100 slidably arranged on the support frame 200, wherein the observation device 100 includes a camera or an eyepiece 101, an objective lens 103 and a lens barrel part 102; and a fixed focus device 300 having one end fixedly connected to the observation device 100 and another end in contact with the sample plate 500, which maintains a vertical distance between the sample plate 500 and the objective lens 103 to be unchanged.

Since there inevitably are flatness errors on the stage 400 and the sample plate 500, the fixed focus device 300 is additionally mounted between the observation device 100 and the sample plate 500 according to the present application. An end of the fixed focus device 300 close to the sample plate 500 is defined as a second end, and another end is defined as a first end. When an imaging distance between the objective lens 103 and the sample plate 500 and a length of the fixed focus device 300 are determined, a imaging distance is reserved between a tip of the second end of the fixed focus device 300 and the objective lens 103, and then the first end of the fixed focus device 300 is fixed to the observation device 100. In the present application, the fixed focus device 300 is a rigid structure and is not apt to be deformed, therefore the imaging distance between the tip of the second end of the fixed focus device 300 and the objective lens 103 can be maintained to be unchanged.

The second end of the fixed focus device 300 is in contact with the sample plate 500. When the sample plate 500 has a small protrusion, the second end of the fixed focus device 300 is pushed by the protrusion of the sample plate 500, causing the observation device 100 to move upward along with the protrusion, and since the positions of the objective lens 103 and the fixed focus device 300 are unchanged, the distance between the objective lens 103 and the sample plate 500 can further be maintained to be unchanged, i.e., the imaging distance is unchanged. When the sample plate 500 has a small depression, the second end of the fixed focus device 300 is always in contact with the sample plate 500 under the action of self-gravity of the observation device 100, thus the imaging distance between the objective lens 103 and the sample plate 500 is maintained to be unchanged.

It can be known from the above contents that, in the present application, the distance between the tip of the fixed focus device 300 and the objective lens 103 is the imaging distance, and as the sample plate 500 protrudes and depresses, the fixed focus device 300 may also move up and down along with the sample plate 500, which enables the tip of the fixed focus device 300 to be always in contact with the sample plate 500, and further allows the distance between the sample plate 500 and the objective lens 103 to be always the imaging distance.

Figure 2:
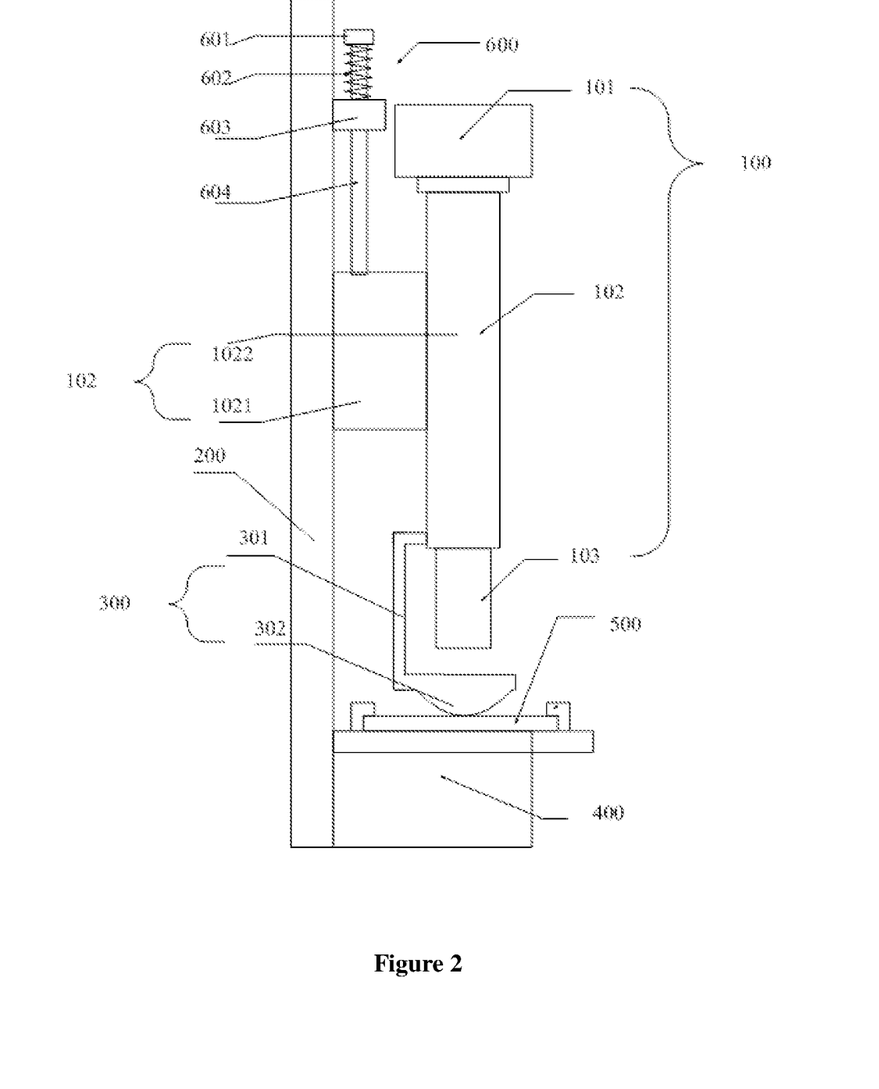
FIG. 2 is a view showing the structure of another follow-up fixed focus system disclosed in an embodiment of the present application.

In normal conditions, the assembly of the observation device 100 and the fixed focus device 300 is relatively heavy. In order to protect the sample plate 500 from being crushed by the assembly of the observation device 100 and the fixed focus device 300, as shown in FIG. 2, an elastic structure 600 connected to the support frame 200 and the observation device 100 or connected to the support frame 200 and the fixed focus device 300 is further additionally provided according to the present application. The elastic structure 600 may support the observation device 100 and the fixed focus device 300.

The elastic structure 600 can support the observation device 100 and the fixed focus device 300, specifically, an upward pulling force is provided to the observation device 100 and the fixed focus device 300, and the action force that presses the sample plate 500 is small in the case that the pulling force and the gravities of the observation device 100 and the fixed focus device 300 are balanced, which protects the integrity of the sample plate 500.

The elastic structure 600 may be a mechanical elastic device, a pneumatic elastic device and/or a hydraulic elastic device. The main function of the elastic structure 600 is to provide an upward pulling force to the observation device 100 and the fixed focus device 300. The elastic structure 600, which is embodied as a mechanical elastic device, is described in detail hereinafter with reference to FIG. 2.

As shown in FIG. 2, the elastic structure 600 includes: a position-limiting component 603 arranged on the support frame 200; a connecting rod 604 running through the position-limiting component 603, wherein the connecting rod 604 has one end fixedly connected to the observation device 100 or the fixed focus device 300 and another end provided with a projection 601; and a spring 602 sleeved on the connecting rod 604 and stuck between the position-limiting component 603 and the projection 601.

The spring 602 stuck between the position-limiting component 603 and the projection 601 is a preloaded spring 602, and the spring 602 is applied with a preloaded force. The specific process is that: the preloaded force of the spring 602 acts between the position-limiting component 603 and the projection 601, and the position-limiting component 603 is fixed, thus an upward action force is applied to the projection 601 under the action of the preloaded force. The connecting rod 604 is moved by the projection 601 and an upward action force is applied to the connecting rod 604. The connecting rod 604 is connected to the observation device 100, thus an upward action force is also applied to the observation device 100. The preloaded force of the spring 602 is less than or equal to the gravity of the assembly of the fixed focus device 300 and the observation device 100, since the fixed focus device 300 may be not contact with the sample plate 500 due to a too large preloaded force and may further be suspended, which may otherwise cause the distance between the sample plate 500 and the objective lens 103 to be greater than the imaging distance.

The device as shown in FIG. 1 can only be used in the case that the observation device 100 is upright. In the case that the observation device 100 is upside down, the observation device 100 and the fixed focus device 300 move downward due to the action of gravity, causing the fixed focus device 300 to be not in contact with the sample plate 500. In this case, an upward action force manually to the observation device 100 is needed, which hinders the downward movement of the observation device 100 and the fixed focus device 300, and allows the fixed focus device 300 to be always in contact with the sample plate 500.

However, a manual operation may inevitably cause an uneven force or fail to achieve the object of maintaining the fixed focus device 300 to be always in contact with the sample plate 500. Therefore, an elastic structure 600 is further additionally provided based on the original structure in the case that the observation device 100 is upside down according to the present application, and the illustration of the structure of the observation device 100 in the case of being upside down is as shown in FIG. 3.

The structure may include: a stage 400; a sample plate 500 fixed on the stage 400; a support frame 200 vertically connected to the stage 400; an observation device 100 slidably arranged on the support frame 200, wherein observation device 100 includes a camera or an eyepiece 101, an objective lens 103 and a lens barrel part 102; a fixed focus device 300 having one end fixedly connected to the observation device and another end in contact with the sample plate 500, wherein a vertical distance between the sample plate 500 and the objective lens 103 is maintained to be unchanged by fixed focus device 300; and an elastic structure 600 connected to the support frame 200 and the observation device 100 or connected to the support frame 200 and the fixed focus device 300, which may support the observation device 100 and the fixed focus device 300.

Figure 3:
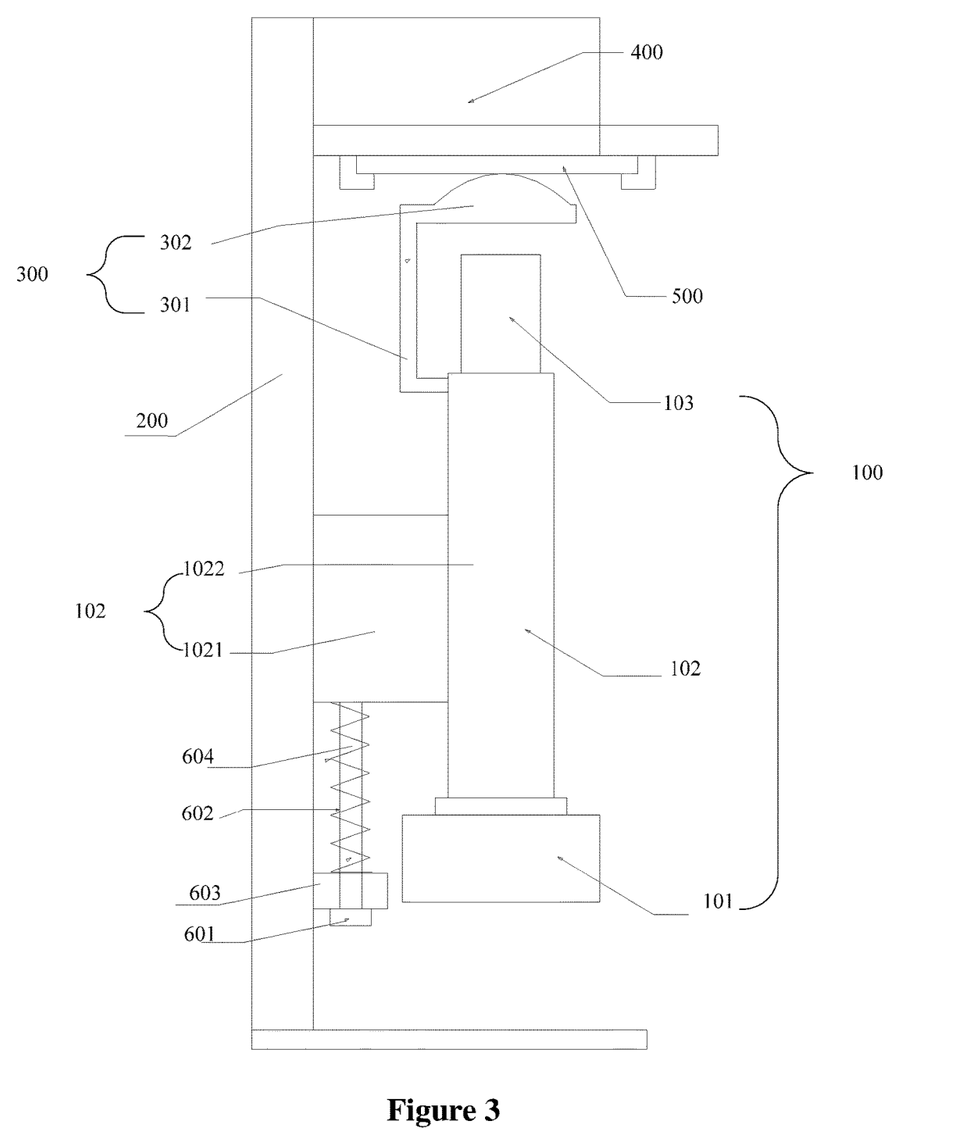
FIG. 3 is a view showing the structure of another follow-up fixed focus system disclosed in an embodiment of the present application.

The device shown in FIG. 3 is similar to that shown in FIG. 1, which is simply additionally provided with the elastic mechanism based on the structure in FIG. 1, and the elastic mechanism may include a mechanical elastic device, a pneumatic elastic device and/or a hydraulic elastic device. As shown in FIG. 3, the mechanical elastic device is described in detail, specifically including:

a position-limiting component 603 arranged on the support frame 200; a connecting rod 604 running through the position-limiting component 603, wherein the connecting rod 604 has one end fixedly connected to the observation device 100 or the fixed focus device 300 and another end provided with a projection 601; a spring 602 sleeved on the connecting rod 604 and stuck between the position-limiting component 603 and the observation device 100.

The spring 602 stuck between the position-limiting component 603 and the observation device 100 may also be a preloaded spring 602, and the spring 602 is preset with a preloaded force, and the preloaded force of the spring 602 is greater than the assembly of the fixed focus device 300 and the observation device 100. The preloaded force of the spring 602 acts on the position-limiting component 603 at one end, and acts on the observation device at another end. The position-limiting component 603 is fixed, therefore, the preloaded force may apply an upward pushing force to the observation device 100, and an upward pushing force may also be applied to the fixed focus device due to the observation device 100, which allows the fixed focus device to be in contact with the sample plate 500.

Functions of other components in FIG. 3 are the same with the functions of the components in FIG. 1, which are not described here.

The connecting rod 604 is connected to the lens barrel part 102 in FIGS. 2 and 3. Indeed, the connecting rod 604 connected to the observation device 100 may specifically be: one end of the connecting rod 604 fixedly connected to the lens barrel part 102 of the observation device 100; or one end of the connecting rod 604 connected to the objective lens 103 of the observation device 100; or one end of the connecting rod 604 connected to the camera or the eyepiece 101 of the observation device 100. That is, that the connecting rod 604 is connected to the observation device 100 would meet the requirement, since the connecting rod 604 provides an action force to the observation device 100 and the action force cannot be transmitted if the connecting rod 604 and the observation device 100 are not connected.

FIGS. 1, 2 and 3 show that the lens barrel part of the observation device is slidably arranged on the support frame, which may apparently also be in other forms. The observation device 100 slidably arranged on the support frame 200 may specifically be:

the lens barrel part 102 of the observation device 100 slidably arranged on the support frame 200; or the objective lens 103 of the observation device 100 slidably arranged on the support frame 200; or the camera or the eyepiece 101 of the observation device 100 slidably arranged on the support frame 200.

As shown in FIGS. 1, 2, and 3, the lens barrel part 102 includes: a connecting platform 1021 and a lens barrel 1022.

The connecting platform 1021 has one end fixedly connected to the lens barrel 1022 and another end slidably arranged on the support frame 200.

The fixed focus device 300 is described in detail hereinafter. The fixed focus device 300 may has various implementations. Three implementations are described below, and it may be appreciated that, other implementations which can achieve the effect of the fixed focus device 300 should all fall into the scope of the present application.

Figure 4:
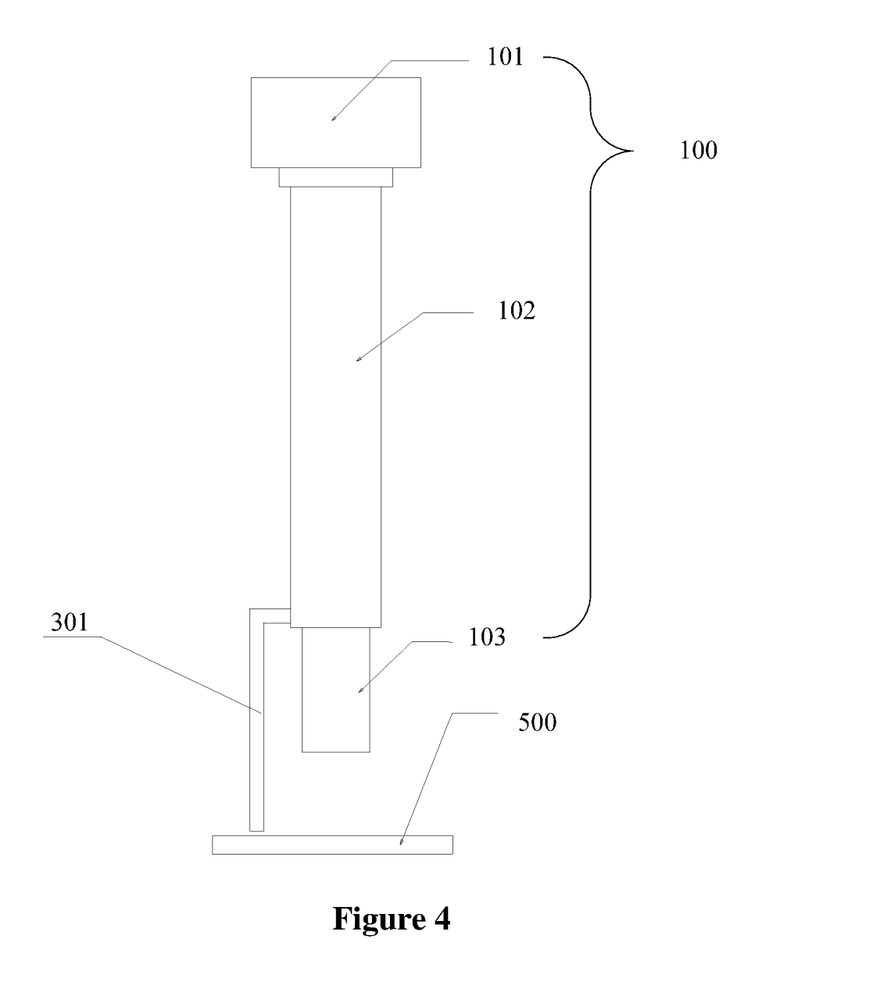
FIG. 4 is a view showing the structure of another follow-up fixed focus system disclosed in an embodiment of the present application.

A first implementation: as shown in FIG. 4, the fixed focus device 300 is a support rod 301, and the support rod 301 has one end fixedly connected to the observation device 100 and another end in contact with the sample plate 500.

The implementation of the support rod 301 is simple, but has deficiencies of an unreliable support and an unstable fixation, therefore, a second implementation is further provided according to the present application.

Figure 5:
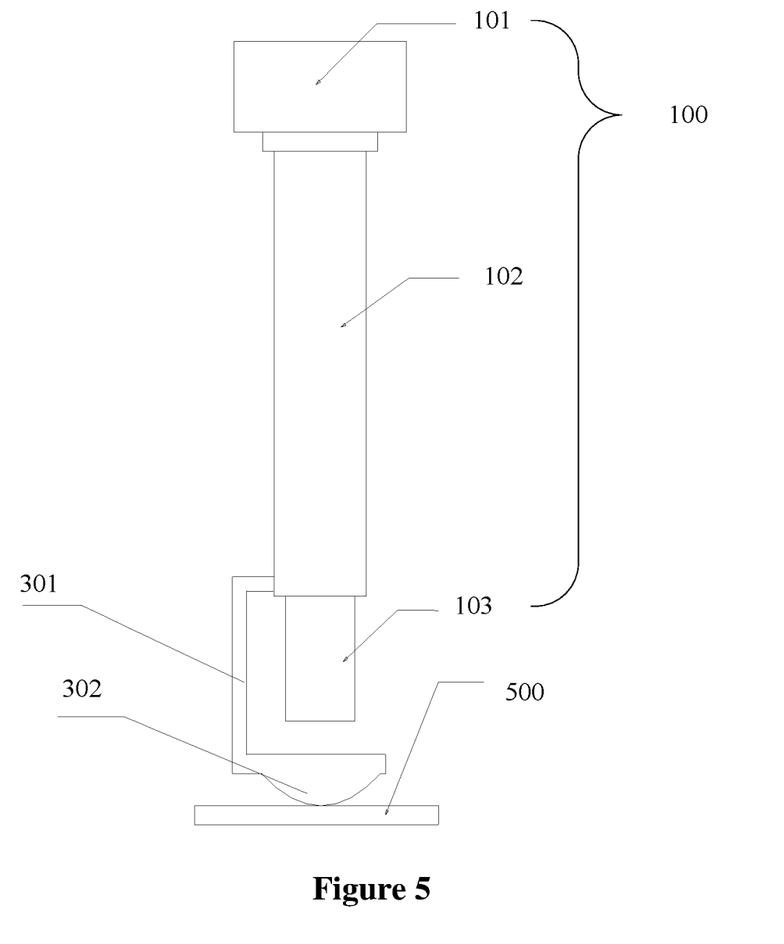
FIG. 5 is a view showing the structure of another follow-up fixed focus system disclosed in an embodiment of the present application.

The second implementation: the fixed focus device 300 includes a support rod 301 and a light-transmittable component 302. The support rod 301 has one end fixedly connected to the observation device 100 and another end fixedly connected to the light-transmittable component 302. A space between the objective lens 103 and the light-transmittable component 302 is hollow.

The second end of the fixed focus device is not a simple rod which plays a supporting role, but the light-transmittable component 302 which plays a supporting role. For preventing the light path to the sample plate 500 from being obstructed, the support component is light-transmittable, which facilitates the projection of the incident light into the support component via the sample plate 500. Further, for preventing the light-transmittable component 302 from obstructing the imaging passage between the sample plate and the objective lens 103, the space between the objective lens 103 and the light-transmittable component 302 is hollow, thus the imaging passage between the objective lens 103 and the sample plate 500 is not affected by the light-transmittable component 302.

Figure 6:
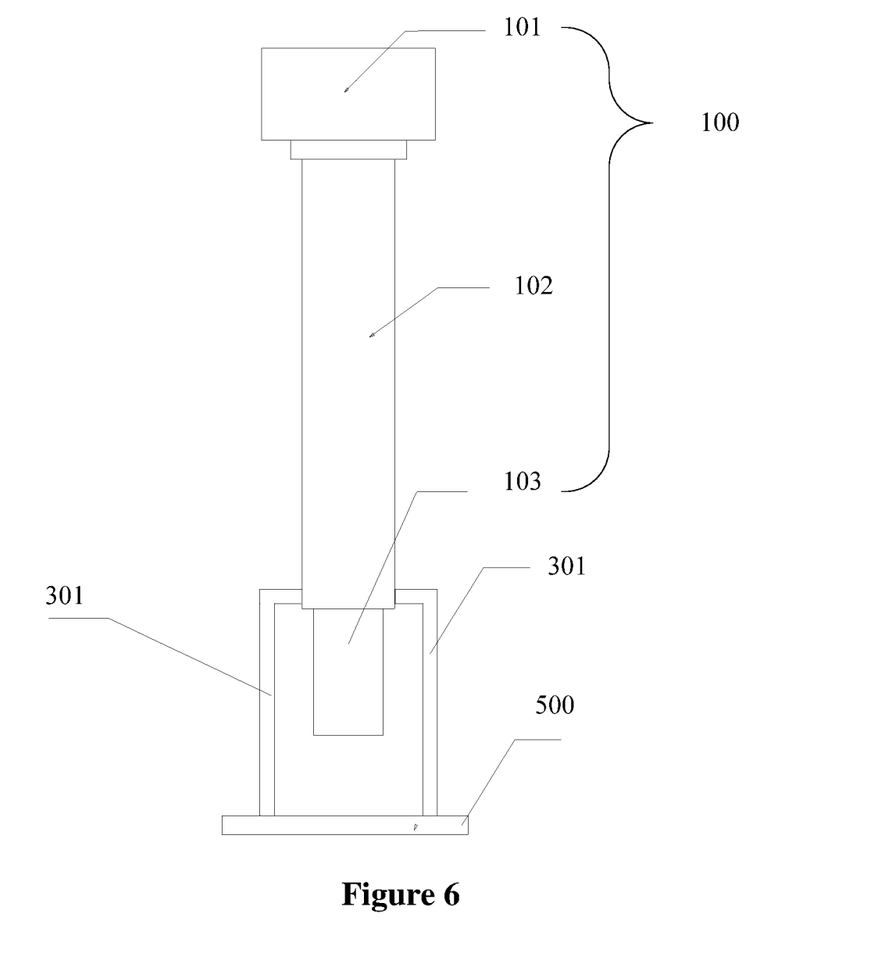
FIG. 6 is a view showing the structure of another follow-up fixed focus system disclosed in an embodiment of the present application.

A third implementation: since one support rod 301 employed in the first implementation is not stable, in this implementation, two support rods 301 are employed, and the two support rods 301 are fixed to two sides of the observation device 100 respectively. The support rods 301 have a same length, and are fixed to the observation device 100 at corresponding positions. In this way, a force may evenly be applied on the observation device 100, which may be stable relatively.

In the above implementations, one end of the support rod 301 fixedly connected to the observation device 100 specifically is:

one end of the support rod 301 fixedly connected to the camera or the eyepiece 101 of the observation device 100; or one end of the support rod 301 fixedly connected to the lens barrel of the observation device 100; and/or one end of the support rod 301 fixedly connected to the objective lens 103 of the observation device 100.

The above are only three implementable manners, it may be appreciated that, any implementations, which can maintain the imaging distance between the objective lens 103 and the sample plate 500 to be unchanged by other devices, should all fall in the scope of the present application.

The follow-up fixed focus system is provided according to the present application. This system includes the fixed focus device 300, and the second end of the fixed focus device 300 is in contact with the sample plate 500. When the sample plate 500 has a small protrusion, the second end of the fixed focus device 300 is pushed by the protrusion of the sample plate 500, causing the observation device 100 to move upward along with the protrusion. Since the positions of the objective lens 103 and the fixed focus device 300 are unchanged, the distance between the objective lens 103 and the sample plate 500 can further be maintained to be unchanged, i.e., the imaging distance is unchanged. When the sample plate 500 has a small depression, the second end of the fixed focus device 300 is always in contact with the sample plate 500 under the action of self-gravity of the observation device 100, thus the imaging distance between the objective lens 103 and the sample plate 500 is maintained to be unchanged.

The system achieves an aspect of the present application by simply adding the fixed focus device 300, and the fixed focus device 300 has a simple structure, a low cost, and is easy to implement and has a good stability, and can address the issue of focus deviation of a sample caused by movement of the movable platform.

The above embodiments are described in a progressive manner. Each of the embodiments is mainly focused on describing its differences from other embodiments, and references may be made among these embodiments with respect to the same or similar portions among these embodiments.

Based on the above description of the disclosed embodiments, the person skilled in the art is capable of carrying out or using the present application. It is obvious for the person skilled in the art to make many modifications to these embodiments. The general principle defined herein may be applied to other embodiments without departing from the spirit or scope of the present application. Therefore, the present application is not limited to these embodiments illustrated herein, but should be defined by the broadest scope consistent with the principle and novel features disclosed herein.

The invention claimed is:

1. A follow-up fixed focus system, comprising:
a stage;
a sample plate fixed on the stage;
a support frame vertically connected to the stage; and an observation device slidably arranged on the support frame, wherein the observation device comprises a camera or an eyepiece, an objective lens and a lens barrel part; and a fixed focus device having one end fixedly connected to the observation device and another end in contact with the sample plate, and wherein the fixed focus device maintains a vertical distance between the sample plate and the objective lens to be unchanged, wherein the fixed focus device comprises a support rod and a light-transmittable component, and the support rod has one end fixedly connected to the observation device and another end fixedly connected to the light-transmittable component, and a space between the objective lens and the light-transmittable component is hollow.

2. The follow-up fixed focus system according to claim 1, wherein the fixed focus device is a support rod, and the support rod has one end fixedly connected to the observation device and another end in contact with the sample plate.

3. The follow-up fixed focus system according to claim 2, wherein one end of the support rod fixedly connected to the observation device specifically is:

one end of the support rod fixedly connected to the camera or the eyepiece of the observation device; or one end of the support rod fixedly connected to the lens barrel of the observation device; or one end of the support rod fixedly connected to the objective lens of the observation device.

4. The follow-up fixed focus system according to claim 1, wherein one end of the support rod fixedly connected to the observation device specifically is:

one end of the support rod fixedly connected to the camera or the eyepiece of the observation device; or one end of the support rod fixedly connected to the lens barrel of the observation device; or one end of the support rod fixedly connected to the objective lens of the observation device.

5. The follow-up fixed focus system according to claim 1, further comprising:

an elastic structure connected to the support frame and the observation device or connected to the support frame and the fixed focus device, wherein the elastic structure supports the observation device and the fixed focus device.

6. The follow-up fixed focus system according to claim 5, wherein the fixed focus device is a support rod, and the support rod has one end fixedly connected to the observation device and another end in contact with the sample plate.

7. The follow-up fixed focus system according to claim 5, wherein the elastic structure comprises:

a mechanical elastic device, a pneumatic elastic device and/or a hydraulic elastic device.

8. The follow-up fixed focus system according to claim 7, wherein in the case that the observation device is upside down, the mechanical elastic device comprises:

a position-limiting component arranged on the support frame; a connecting rod running through the position-limiting component, wherein the connecting rod has one end fixedly connected to the observation device or the fixed focus device and another end provided with a projection; and a spring sleeved on the connecting rod and stuck between the position-limiting component and the observation device.

9. The follow-up fixed focus system according to claim 8, wherein one end of the connecting rod connected to the observation device specifically is:

one end of the connecting rod fixedly connected to the lens barrel part of the observation device; or one end of the connecting rod connected to the objective lens of the observation device; or one end of the connecting rod connected to the camera or the eyepiece of the observation device.

10. The follow-up fixed focus system according to claim 8, wherein the fixed focus device is a support rod, and the support rod has one end fixedly connected to the observation device and another end in contact with the sample plate.

11. The follow-up fixed focus system according to claim 7, wherein in the case that the observation device is upright, the mechanical elastic device comprises:

a position-limiting component arranged on the support frame; a connecting rod running through the position-limiting component, wherein the connecting rod has one end fixedly connected to the observation device or the fixed focus device and another end provided with a projection; and a spring sleeved on the connecting rod and stuck between the position-limiting component and the projection.

12. The follow-up fixed focus system according to claim 11, wherein the fixed focus device is a support rod, and the support rod has one end fixedly connected to the observation device and another end in contact with the sample plate.

13. The follow-up fixed focus system according to claim 11, wherein one end of the connecting rod connected to the observation device specifically is:

one end of the connecting rod fixedly connected to the lens barrel part of the observation device; or one end of the connecting rod connected to the objective lens of the observation device; or one end of the connecting rod connected to the camera or the eyepiece of the observation device.

14. The follow-up fixed focus system according to claim 13, wherein the observation device slidably arranged on the support frame specifically is:

the lens barrel part of the observation device slidably arranged on the support frame; or the objective lens of the observation device slidably arranged on the support frame; or the camera or the eyepiece of the observation device slidably arranged on the support frame.

15. The follow-up fixed focus system according to claim 14, wherein the lens barrel part comprises:

a connecting platform and a lens barrel, and wherein the connecting platform has one end fixedly connected to the lens barrel and another end slidably arranged on the support frame.

* * * * *